June 22, 1954 F. W. WAHLIN 2,681,829
SPRAY NOZZLE STRAINER OR THE LIKE
Filed June 13, 1952
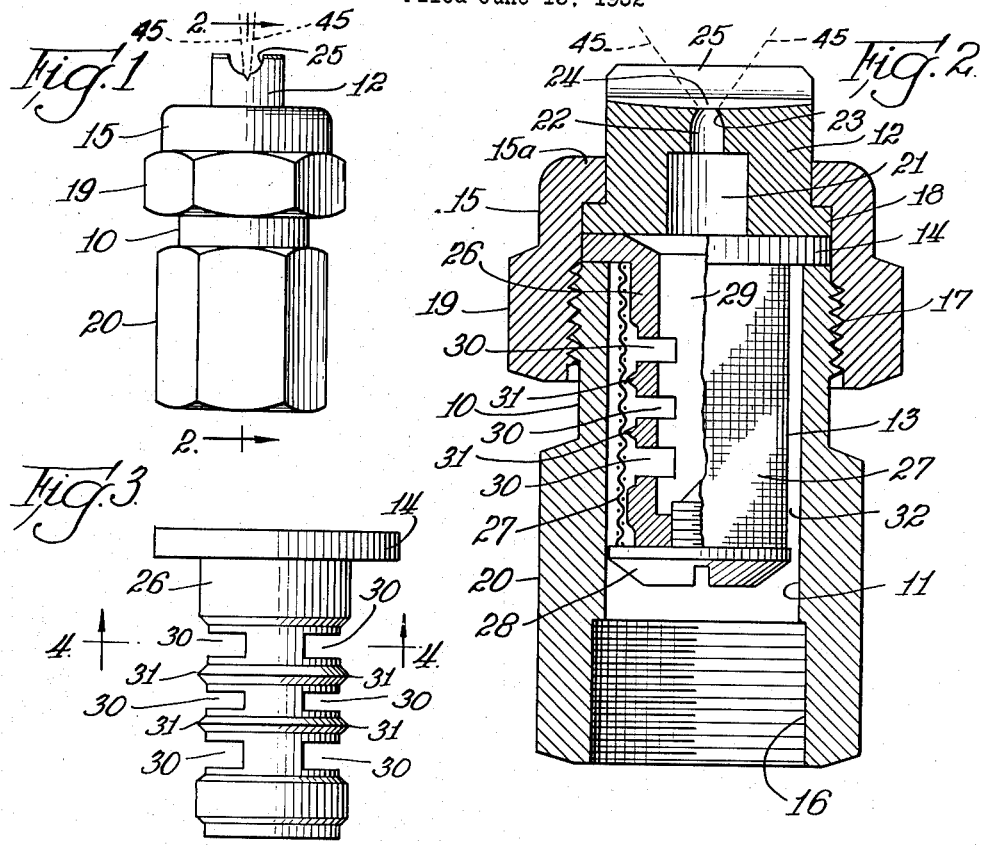
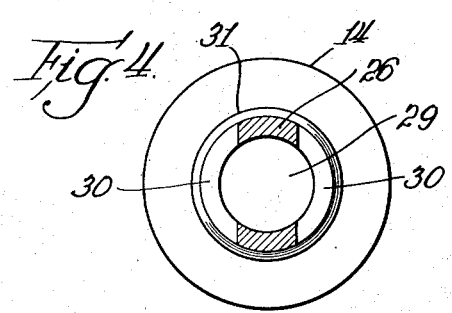
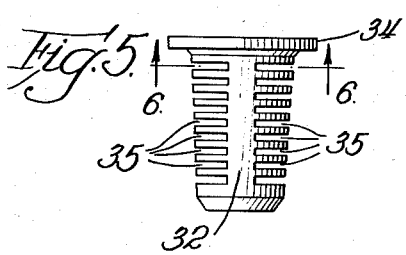
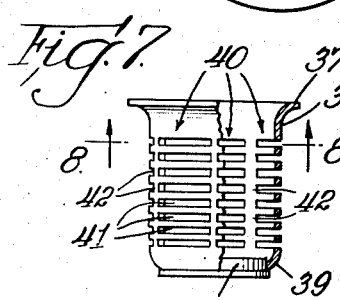
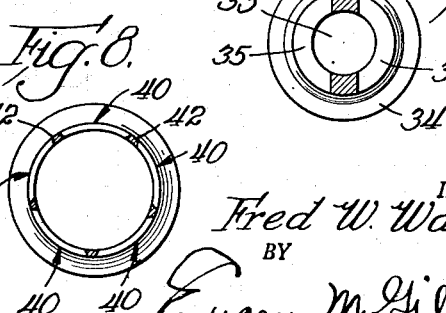
INVENTOR.
Fred W. Wahlin
BY
Eugene M. Giles
Atty.

Patented June 22, 1954

2,681,829

UNITED STATES PATENT OFFICE 2,681,829

SPRAY NOZZLE STRAINER OR THE LIKE

Fred W. Wahlin, Oak Park, Ill., assignor to Spraying Systems Co., Bellwood, Ill., a corporation of Illinois Application June 13, 1952, Serial No. 293,400

5 Claims. (Cl. 299—107)

My invention relates to strainers for spray nozzles or the like of cylindrical or substantially cylindrical type suitable for use in the barrel of spray nozzles to strain the liquid supplied to the nozzle orifice, and has reference more particularly to the construction thereof with axially spaced peripheral slots through which the liquid passes to or from the interior of the cylinder, this application being a continuation in part of my co-pending application Serial No. 81,288, filed March 14, 1949, now Pat. No. 2,621,078, granted December 9, 1952.

Heretofore in spray nozzles and the like the strainer has usually been made with a hollow cylindrical body which has relatively wide slots of substantial length extending lengthwise thereof at intervals around the body, and is telescoped into a close fitting cylindrical screen through which the liquid is strained as it flows to or from the interior of the body.

Generally the strainer is located in the nozzle barrel or body in a cylindrical opening in which the liquid flows in a direction lengthwise along the strainer, and within the strainer the liquid flows in the same direction, and accordingly the relatively long lengthwise slots of the strainer body permit the liquid to flow to or from the interior of the strainer in substantially the same direction of flow as that of the liquid at the exterior and interior of the strainer body.

Consequently obstruction or partial obstruction of the strainer at any place therearound, impeded or retarded the longitudinal flow at that place and imposed increased longitudinal flow at the opposite side or some other place around and through the strainer, and had a tendency to unbalance the stream flow to the nozzle orifice which is usually located near to the discharge end of the strainer.

The principal objects of my invention are to provide an improved cylindrical or substantially cylindrical strainer; to construct the strainer so that the flow of liquid to and from the interior thereof is transverse to the longitudinal axis of the strainer; and to provide a peripheral slotting of the strainer cylinder which permits the body itself to constitute the straining medium and to dispense with the usual screen if desired; these and other objects being accomplished as explained hereinafter and as shown in the accompanying drawing, in which:

Fig. 1 is a side view of a spray nozzle in which the strainer of this invention may be advantageously employed;

Fig. 2 is a sectional view on the line 2—2 thereof showing the strainer therein, partly in section;

Fig. 3 is a side view of the strainer body of the strainer shown in Fig. 2;

Fig. 4 is a cross sectional view of the strainer body taken on the line 4—4 of Fig. 3;

Fig. 5 is a side view, with portions broken away of a modified form of strainer having circumferential straining slots;

Fig. 6 is a cross sectional view taken on the line 6—6 of Fig. 5;

Fig. 7 is a view similar to Fig. 5 showing a modified form of that strainer; and Fig. 8 is a cross sectional view taken on the line 8—8 of Fig. 7.

Referring to the drawing, which shows in Figs. 1, 2, 3 and 4 a nozzle and strainer of the same construction as shown and described in my above mentioned application Serial No. 81,288, now Pat. No. 2,621,078, granted December 9, 1952, the reference numeral 10 indicates the nozzle body which has a large cylindrical opening 11 therethrough, 12 a flat sided nozzle tip which is made as a separate part and secured to the outer end of the body 10, 13 a strainer which is secured centrally in the cylindrical opening 11 of the body and has an annular flange 14 at the outer end thereof interposed between the nozzle tip 12 and the outer end of the body 10, and 15 a clamping member by which the nozzle tip 12 is secured to the body 10.

The body 10 is internally threaded at 16 at its end remote from the tip 12 for connection to a pipe or other means through which liquid is supplied to the nozzle and the other end of the body is externally threaded at 17 for threaded connection therewith of the clamping member 15 which is of collar nut type with the outer end of the collar turned in as at 15ª to engage over an annular flange 18 at the base of the nozzle tip for clamping the latter against the outer end of the strainer 13 and the strainer flange 14 against the outer end of the nozzle body. The clamping member 15 and body 10 each have a portion of the length thereof of external hexagonal form as indicated at 19 and 20 respectively, or of other suitable form for wrench engagement for conveniently securing the parts together.

The nozzle tip 12 has a bored out cavity 21 communicating with the interior of the strainer body 10 and leading to a relatively small diameter bore 22 with rounded or dome shaped outer end 23 through which the spray orifice 24 is formed.

This orifice 24 is recessed in the end of the nozzle at the bottom of a channel or groove 25 which extends across the nozzle end, the bottom of said channel or groove 25 being slightly beyond the dome shaped top 23 so as to leave only a thin wall of stock through which the orifice 24 extends, and the orifice is elongated in the direction of the length of the channel or groove 25 and of relatively narrow width to produce a fan shaped spray as indicated by dotted lines at 45 in Figs. 1 and 2.

The strainer 13 comprises a hollow cylindrical body 26 surrounded by a cylindrical screen 27 which is secured thereon by a screw 28 threaded into the lower end of the strainer body 26, and having a large head against which the lower end of the screen 27 abuts, the other end of said screen being abutted thereby against the underside of the flange 14, as shown in Fig. 2, at the other end of the nozzle body 20.

Thus the lower end of the opening or chamber 29 in the hollow cylindrical body 26 is closed and the upper end thereof communicates directly with the cavity 21 of the nozzle tip.

The surrounding wall of the strainer body is provided with a series of wide circumferential slots 30 therealong at opposite sides of the strainer body which open radially inwardly through the strainer body wall directly toward the axis of the opening 29, the strainer body 26 being turned down to a smaller external diameter throughout the portion of the length thereof where the slots 30 are located, to provide free access to the slots of liquid entering through the screen at any place therearound, but leaving circumferential ribs 31 between the slots to support the screen 27 therebetween, all as shown in Figs. 2, 3 and 4.

Thus the liquid supplied to the nozzle orifice 24 enters at the lower end of the nozzle and flows upwardly in the opening 11 in the circumferential space 32 around the strainer 13 in a direction lengthwise thereof, and at the location of the slots 30, flows inwardly therethrough in a generally radial direction to the opening or chamber 29 therein in which it flows axially upward to the nozzle tip cavity 21 and bore 22 through which it is supplied to the orifice 24.

Instead of employing a screen covered strainer body with wide slots, such as shown in Figs. 2, 3 and 4, a strainer may be employed, such as shown in Figs. 5 and 6, comprising a hollow, substantially cylindrical strainer body 32 having an opening 33 therein which extends lengthwise thereof and is closed at the lower end and open at the upper end, and having a flange 34 around the upper end thereof, and corresponding to the flange 14 of the previously described strainer of Figs. 2, 3 and 4, by which it is secured in the nozzle in the same manner as the strainer of Figs. 2, 3 and 4.

Instead of employing a screen, however, this strainer of Figs. 5 and 6, which is preferably of a generally cylindrical form, but slightly tapered from the upper to the lower end as shown particularly in Fig. 5, has the peripheral wall thereof provided with a series of circumferential slits 35 therealong at opposite sides of the strainer body 32 and which open radially inward through the strainer body wall in a radial direction toward the axis of the opening 33, these slits being arranged in close adjoining relation serially and of sufficiently narrow width and sufficiently numerous so that these slits 35 themselves serve to strain the liquid supplied to the nozzle orifice.

The strainer shown in Figs. 7 and 8 is similar to that of Figs. 5 and 6 but is made of a length of thin walled cylindrical tubing 36 which is flared at the upper open end to provide the mounting flange 37 and at its lower end is closed by a plug 38 against the periphery of which the lower end of the tube is contracted, as at 39, to secure the plug 38 in place.

Moreover, in the Figs. 7 and 8 construction, instead of having two opposed series of slits at the opposite sides respectively of the body, there are five adjoining rows or series 40 of slits therearound each of which said rows or series 40 comprises a plurality of narrow circumferential slits 41 arranged side by side in close adjoining relation throughout the length of the cylindrical wall portion of the strainer as shown in Fig. 7.

These slits are preferably made with a small circular cutter, or a group of such cutters, which is projected radially inward to cut the grooves so that the ends of the grooves of adjoining rows 40 are quite close together, as indicated in Fig. 8, and with only a narrow width of stock therebetween as indicated at 42, of sufficiently abrupt slope at the adjoining slit ends so that the length of the slits is not materially reduced by circumferential expanse of stock between the ends of the slits.

These slits 41, like the slits 35 of the Figs. 5 and 6 strainer, open radially inward through the strainer tube or body 36, toward the axis of the opening therein, and because of the number of rows of slits 41 around the tube 36 and the uniform spacing thereof from one another, the inflow of liquid into the interior of the tube 36 is substantially uniform therearound.

While I have shown and described my invention in a preferred form, I am aware that various changes and modifications may be made therein without departing from the principles of the invention, the scope of which is to be determined by the appended claims.

What I claim is:

1. A liquid conducting device comprising a body having an elongated substantially cylindrical strainer chamber therein with an opening at one end through which liquid is supplied to the chamber and an opening at the other end through which liquid is discharged from said chamber, and a hollow elongated substantially cylindrical strainer body extending lengthwise in said chamber and surrounded by a relatively narrow annular space which communicates at one end with one of said openings, said strainer body having therein a bore which extends lengthwise thereof and is separated from said annular space by the surrounding wall of the strainer body and is closed at one end and open at the other end and communicates through the latter end with the other of the aforesaid openings, said strainer body having means around said latter end of the bore by which the strainer body is mounted in the chamber and which separates the aforesaid annular space from the last mentioned opening, said surrounding wall of the strainer body having a plurality of substantially parallel circumferentially extending slots which are laterally spaced from one another at intervals along the length of the strainer body and open radially through said surrounding wall from the said annular space to the said bore of the strainer body.

2. A liquid conducting device comprising a body having an elongated substantially cylindrical strainer chamber therein with an opening at one end through which liquid is supplied to the chamber and an opening at the other end through which liquid is discharged from said chamber, and a hollow elongated substantially cylindrical strainer body extending lengthwise in said chamber and surrounded by a relatively narrow annular space which communicates at one end with one of said openings, said strainer body having therein a bore which extends lengthwise thereof and is separated from said annular space by the surrounding wall of the strainer body and is closed at one end and open at the other end and communicates through the latter end with the other of the aforesaid openings, said strainer body having an annular flange integral therewith around said latter end of the bore by which the strainer body is mounted in the chamber and which separates the aforesaid annular space from the last mentioned opening, said surrounding wall of the strainer body having a plurality of circumferentially spaced rows of slots each row of which comprises a plurality of substantially parallel circumferentially extending slots which are laterally spaced from one another at intervals along the length of the strainer body and open radially through said surrounding wall from the said annular space to the said bore of the strainer body.

3. A liquid conducting device comprising a body having an elongated substantially cylindrical strainer chamber therein with an opening at one end through which liquid is supplied to the chamber and an opening at the other end through which liquid is discharged from the chamber, and a strainer in said chamber comprising a thin walled cylindrical tube extending lengthwise in said chamber and surrounded by a relatively narrow annular space which communicates at one end with one of said openings, said tube being closed at one end and open at the other end to the other of the aforesaid openings and at the latter end having an annular flange by which it is mounted in the chamber and which separates the aforesaid annular space from the last mentioned opening, said tube having a plurality of circumferentially equispaced rows of slits each row of which comprises a plurality of substantially parallel circumferentially extending slits which are spaced laterally from one another in closely adjoining relation along the length of the tube and open radially therethrough from said annular space to the interior of the tube.

4. A spray nozzle having a spray orifice at one end, a cylindrical strainer chamber therein axially aligned with said orifice, and an inlet opening at the other end, and a hollow elongated cylindrical strainer body concentric with and extending lengthwise in said chamber and surrounded by a relatively narrow annular space which communicates at one end with the said inlet opening, said strainer body having therein a bore which extends lengthwise thereof and is axially aligned with said orifice and separated from said annular space by the surrounding wall of the strainer body and closed at the end nearest said inlet opening and open at the other end to said spray orifice, said strainer body having an annular flange around the latter open end of the bore by which the strainer body is supported and which separates the aforesaid annular space from the spray orifice, said surrounding wall of the strainer body having a plurality of substantially parallel circumferentially extending slots which are laterally spaced from one another at intervals along the length of the strainer body and open radially through said surrounding wall from said annular space to said bore of the strainer body.

5. A spray nozzle having a spray orifice at one end, a cylindrical strainer chamber therein axially aligned with said orifice, and an inlet opening at the other end, and a hollow elongated cylindrical strainer body concentric with and extending lengthwise in said chamber and surrounded by a relatively narrow annular space which communicates at one end with the said inlet opening, said strainer body having therein a bore which extends lengthwise thereof and is axially aligned with said orifice and separated from said annular space by the surrounding wall of the strainer body and closed at the end nearest said inlet opening and open at the other end to said spray orifice, said strainer body having an annular flange around the latter open end of the bore by which the strainer body is supported and which separates the aforesaid annular space from the spray orifice, said surrounding wall of the strainer body having a plurality of substantially parallel circumferentially extending slots which are laterally spaced from one another at intervals along the length of the strainer body and open radially through said surrounding wall from said annular space to said bore of the strainer body, said strainer body having a cylindrical screen telescoped thereon and circumferential screen supporting ribs between the slots.

References Cited in the file of this patent

UNITED STATES PATENTS

| Number | Name | Date |
| --- | --- | --- |
| 1,795,314 | Philipps | Mar. 10, 1931 |
| 2,055,864 | Harsch | Sept. 29, 1936 |